United States Patent [19]

Reinauer et al.

[11] Patent Number: 4,486,625
[45] Date of Patent: Dec. 4, 1984

[54] COMPUTERIZED MEASUREMENT RESPONSE SYSTEM

[75] Inventors: B. Franklin Reinauer, Ridgewood; Robert J. Dydo, Butler, both of N.J.

[73] Assignee: Clear Meadow Research Co., Hackensack, N.J.

[21] Appl. No.: 427,977

[22] Filed: Sep. 29, 1982

[51] Int. Cl.³ .......................................... H04M 11/04
[52] U.S. Cl. ............................. 179/2 A; 179/2 AM; 179/5 R
[58] Field of Search ............... 179/2 A, 2 AM, 5 R, 179/5 P; 340/870.02, 618, 870.03

[56] References Cited

U.S. PATENT DOCUMENTS

| | | | |
|---|---|---|---|
| 3,588,357 | 6/1971 | Sellari, Jr. ...................... | 179/2 AM |
| 3,842,208 | 10/1974 | Paraskevakos ................. | 179/2 A X |
| 3,899,639 | 8/1975 | Cleveley et al. ................ | 179/2 AM |
| 4,059,727 | 11/1977 | Kingswell et al. .............. | 179/2 AM |
| 4,147,893 | 4/1979 | Matson ........................ | 179/2 AM X |
| 4,408,204 | 10/1983 | Salvesen ...................... | 340/870.02 X |

FOREIGN PATENT DOCUMENTS 1192735 5/1970 United Kingdom ............... 179/2 A

Primary Examiner—Gene Z. Rubinson
Assistant Examiner—W. J. Brady
Attorney, Agent, or Firm—Edward F. Levy

[57] ABSTRACT

An alarm system used in a home or office for determining when the consumption of oil or other utility in a tank has been depleted to a predetermined alarm level, and automatically telephoning a computer located at the utility company's office to report the alarm and request delivery of fuel. A pump run count is calculated corresponding to the number of cycles of electricity required to pump a given amount of fuel down to a predetermined alarm level in the tank. As fuel is displaced by the pump, a counter is advanced until it reaches the pump run count whereafter an alarm is activated to cause the alarm system to automatically seize the customer telephone service and dial the computer at the utility office for requesting delivery of fuel oil. The system eliminates the human intervention for reading meters and calling the fuel oil company over the telephone to place an order for delivery.

10 Claims, 7 Drawing Figures

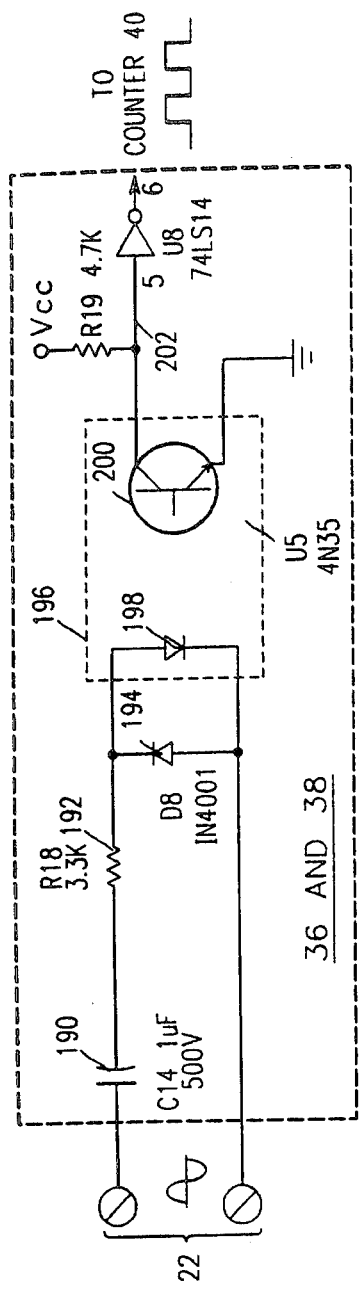
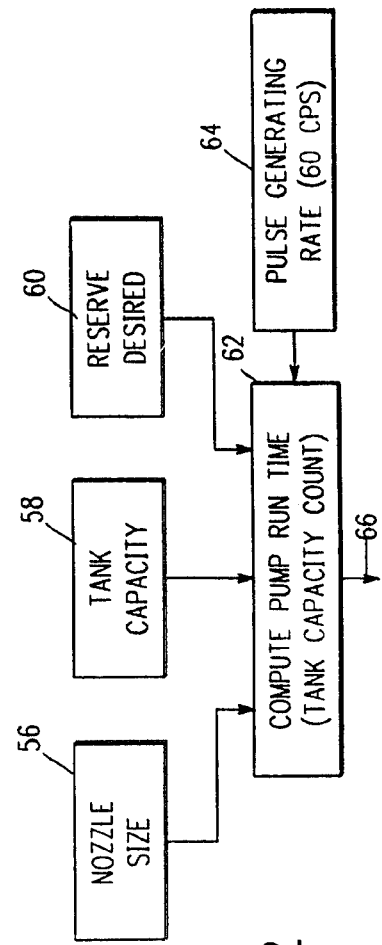
FIG. 7
FIG. 2

COMPUTERIZED MEASUREMENT RESPONSE SYSTEM

TECHNICAL FIELD

The present invention relates to alarm systems for signalling a level of product reached in a tank or other vessel, and more particularly to an alarm system used in a home, factory or other structure for detecting and signalling a predetermined inventory level of fuel oil in a tank or other vessel and automatically sending an alarm to the central office for replenishment of oil.

BACKGROUND ART

Meter reading systems have been used by utility companies to assist in reading electric, water and gas meters in the home by various means which aim to reduce the utility company manpower required to make meter readings in sufficiently frequent intervals such that the homeowner is fairly accurately billed based on his actual consumption. In many instances, customers receive many estimated bills which are largely in error due to either the shortage of company readers in the field and/or the ability of the readers to enter the home. In the case of the delivery of oil to the homes, the human error often results in oil tanks being depleted, incorrect estimates of usage and the failure of the customer to call the fuel company to request delivery. On the other hand, inefficient operation often results from deliveries being made too frequently when not needed.

Attempts to eliminate some of these problems have been made by the water supply companies which connect electric meter reading devices in the home to make readings on a regular basis, such as once a day, and transmit the read data over telephone lines to a central computer which records and stores the readings. The electronic meter reading devices which use the telephone lines for providing readings on a regular basis are not economically advantageous due to the high cost of the meter reading devices and the frequent use of the telephone lines.

U.S. Pat. No. 3,842,208 to Paraskevakos discloses a device which automatically monitors a plurality of sensors, such as alarm devices, and which is activated by the sensors of alarm devices, such as burglar alarms, cardiac alarms and meters for gas and electricity. Electronic circuitry is disclosed connected to the telephone line and the alarm devices for seizing control of the telephone line even if it is currently in use in response to the input sensor circuits of the alarm devices being triggered. The devices disclosed in this patent provide automatic monitoring of a plurality of sensors which, when activated, seizes a telephone line even if such line is in use. This patent relates to the general monitoring of conventional sensor devices and the seizing of telephone lines, but does not solve the problems of providing a simple and accurate measuring means for detecting and signalling a predetermined inventory level of product in a tank and for communicating a prescribed or predetermined consumption of product in the tank. Also, this patent and other prior art monitoring systems do not provide a simple alarm system which determines the consumption of a product in a tank to an alarm level in a simple and accurate manner.

It is an object of the present invention to provide an alarm system for determining when a product in a tank located in a home, factory or other building has been depleted to a predetermined level and for automatically providing an alarm signal for causing replenishment of the product.

It is another object to provide an alarm system used in a home or office for determining when the consumption of a product in a tank has been depleted to a predetermined level, which system is simple and economically feasible to employ in the home or other building.

It is another object to provide a system for automatically signalling to the central office that it is time for replenishment of a tank in an office or other building without requiring the human intervention by the resident or occupant.

It is another object to provide an alarm system for signalling the time for replenishing a product stored in a tank in a home, office or other building which does not require costly and complex meter reading equipment, but does require the reporting of the consumption of the amount of product.

It is another object to provide an alarm system for indicating the consumption of oil or other liquid from a tank or pipeline, and which does not require monitoring or measuring of fluid levels in a tank.

DISCLOSURE OF THE INVENTION

These and other objects are achieved by the present invention which provides an alarm system used in a customer's home, office or other building for determining when the consumption of oil or other utility in a tank or through a pipeline has been depleted to a predetermined alarm level, and automatically calling the central office over a telephone system requesting delivery and replenishment of inventory or consumption of an amount of product. The system does not require human intervention for reading meters or for calling the fuel oil company over the telephone to place an order for delivery. Also, the system does not require meter readings of tank levels or regular readings of utility usage when used in a fuel oil application.

In a preferred embodiment, the specific amount of oil being removed from the tank by an electric pump is predetermined by the pulse generating rate of the electrical power signal to the pump, and the size of the dispensing nozzle in terms of gallons of consumption per run time in relation to the cycles of electricity consumed in operating the pump. Calculation of the pump run time, such as in terms of minutes, is made from the tank capacity or the current tank inventory, the reserve desired at the predetermined alarm inventory level and the pump pulse generating rate. As fuel is displaced by the pump, a current inventory counter, which had previously been set to a count representing the current inventory in the tank, counts down, in terms of minutes of pump run time until it reaches the zero count corresponding to the predetermined alarm level. When the current inventory counter decrements to zero, it causes the alarm system to automatically seize the available customer telephone service and dial the computer modem at the central office for causing a delivery of fuel oil. The counter is reset to a predetermined tank capacity count stored in a register in the alarm system after the tank has been replenished to enable it to repeat the above procedure.

The alarm system, upon receiving the alarm signal from the current inventory counter, determines if the telephone line is clear before automatically calling the central computer modem. The alarm computer section includes registers for storing data which is exchanged with the central computer modem as to the telephone number of the central computer modem, the customer record number, tank capacity in terms of minutes of current pump run time and fuel tank inventory also expressed in terms of minutes by pump run time.

The alarm system of the present invention eliminates the need by utility companies to observe meter reading devices in the home which require making readings on a regular basis. The alarm system also eliminates the need for a person at the customer's home or office to call the utility company on the telephone to provide readings or other data, thereby reducing the high cost of having personnel to read meters and call or otherwise report such readings into a central office.

BRIEF DESCRIPTION OF THE DRAWINGS

FIG. 2 is a flow diagram of the method of calculating a pump run time of a given fuel tank for indicating depletion of the fuel in the tank to a predetermined alarm level in accordance with the pump run time equation;

FIG. 7 is a circuit diagram of the detector used for counting the cycles of electricity supplied during operation of the pump motor.

BEST MODE FOR CARRYING OUT THE INVENTION

Figure 1:
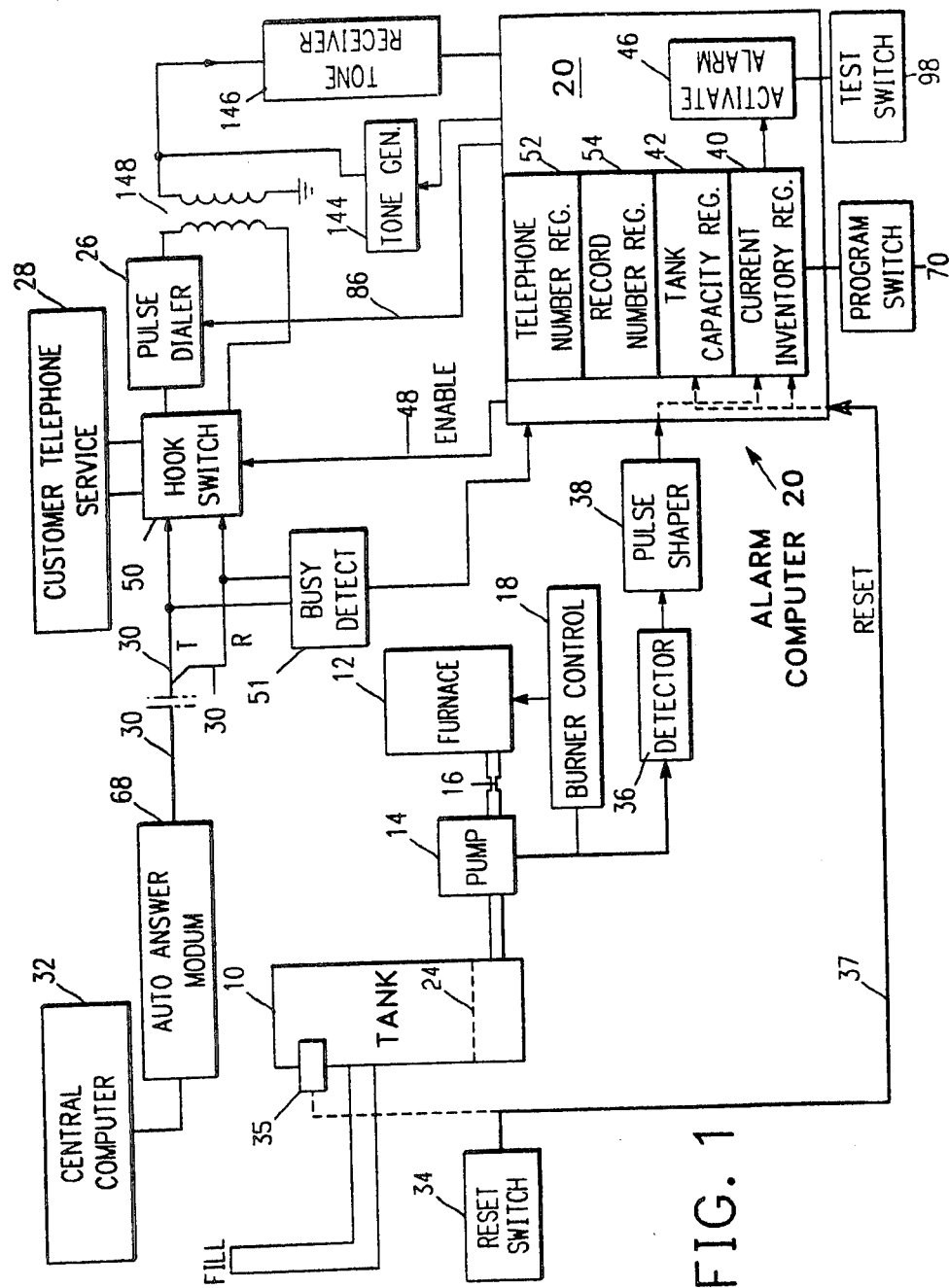
FIG. 1. is a functional block diagram of the alarm system, illustrative of the present invention.

FIG. 1 is a functional block diagram of the alarm system made in accordance with the present invention, and for purposes of illustration, is applied to an oil tank 10 used for heating a residential home or other building. Fuel oil in tank 10 is supplied to a furnace 12 through a pump 14 driven by an A.C. motor and nozzle 16 in the conventional manner, such as by electrical signals from a burner control 18 causing activation and deactivation of electric pump 14 and furnace 12. The alarm system in accordance with the present invention includes an alarm computer portion 20, which is responsive to the electrical connection on line 22 of pump 14 for receiving an electrical signal pulse during the times that such pump 14 is energized for removing oil from tank 10. As will be described in detail below, the alarm system utilizes a number derived from the size of nozzle 16 and the capacity of tank 10. The electrical signal on line 22 represents the alternating current power supply signal to the motor of pump 14 and is used as a measure in determining when the oil in tank 10 has been consumed to a predetermined alarm level, indicated by dotted line 24. When alarm system 20 detects that the alarm condition is reached, the available customer's telephone service 28 is seized and the alarm computer portion 20 automatically calls a stored number via a pulse dialer 26, a hook switch 50 and telephone line 30 to a central computer 32 located at the fuel oil company office to thereby effect a delivery of fuel oil. Upon completion of the delivery of fuel oil, a reset switch 34 can be activated by the delivery man or automatically by a tank fill sensor 35 in tank 10 to reset via line 37 a current tank inventory register or counter 40 to initiate counting of the oil consumption.

The computer section 20 of the alarm system includes circuitry for utilizing the measured run time of the pump 14 together with a predetermined time count, in terms of minutes, related to such run time for activating the alarm. This circuitry includes a detector 36 connected to the pump via electric line 22 for sensing when the pump 14 is on and thereby activating a pulse shaper 38. Detector 36 may comprise a threshhold detector which is part of the pulse shaper 38 for forming the alternating current power supply signals on line 22 from pump 14 which are above a predetermined threshhold level into pulses. Shaper 38 provides pulses to a current inventory counter 40 which has been initially set to the current inventory in the tank, in terms of minutes of pump run time. A tank capacity register 42 stores a number, in minute units of pump run time, which tank capacity number has been determined and set by the central computer 32 based on calculated factors involving the nozzle size and delivery rate of pump 14 required for causing the current inventory counter 40 to reach an alarm condition count. The tank capacity register 42 can be expanded with additional memory for storing various predetermined counts associated with different types of pumps and tanks and their capacities.

Current inventory counter 40 is connected to activate an alarm 46, which may take the form of an enable gate. This provides an enable signal on line 48 to operate a hook switch 50 to disconnect the available customer telephone service 28 to permit communication between the alarm computer portion 20 and the central computer 32 as will be described in detail below. Disconnection of telephone service 28 by hook switch 50 occurs only after a busy detect circuit 51 senses that the line 30 is free and indicates this to the alarm computer section 20.

The computer section 20 also includes a telephone number register 52 for holding the telephone number of the central computer modem 32 and a record number register 54 for holding the account record number assigned by the central computer 32 for the particular account.

Upon installation of this alarm system at a site, communication is established over telephone lines 30 between the installer and computer operator at the central computer 32. At this time, information pertinent to the installation is given by the installer, and the computer operator feeds this information to the computer 32. Computer 32 now calculates the pump run time, using the equation as follows:

$$\text{Run Time (minutes)} = \frac{(\text{Gallon Tank Capacity} - \text{Reserve}) \times 60 \text{ (minutes)}}{\text{Nozzle size}} \quad (1)$$

Referring to FIG. 2 there is shown the method for determining the alarm level tank capacity in units of minutes of pump run time for a given pump and storage tank. The nozzle size and gallonage delivery characteristics of the pump and nozzle are known, as indicated at 56. Subtraction from the tank capacity, expressed in gallons, at 58 of the tank reserve gallonage at 60 occurs when calculating at 62 the operating or run time of the pump required to pump a given amount of product from a storage tank to the reserve or alarm condition level 24. Run time calculations at 62 are in accordance with the run time equation (1) set forth above. The run time calculated at 62 for a given pump is expressed in terms of minutes of pump run time by including the known pulse generating rate at 64 of the pulse shaper 38, such as 60 cycles per second, which provides pulses to the current inventory counter 40 shown in FIG. 1. Computations of this pump run time is carried out in the central computer 32 and provides a pump run time count on line 66 which is used to set the current inventory counter 40.

Once the pump run time is calculated by central computer 32, a signal is provided to the computer operator indicating that it is ready to transmit data to the alarm system. The operator would now enable the computer modem 68. The installer, hearing the modem tone, depresses a "program" key 70 to thereby initiate the program sequence shown in FIG. 5 and described in detail below for the initial exchange and storage of information between the customer alarm system and the central computer modem 32.

Figure 5:
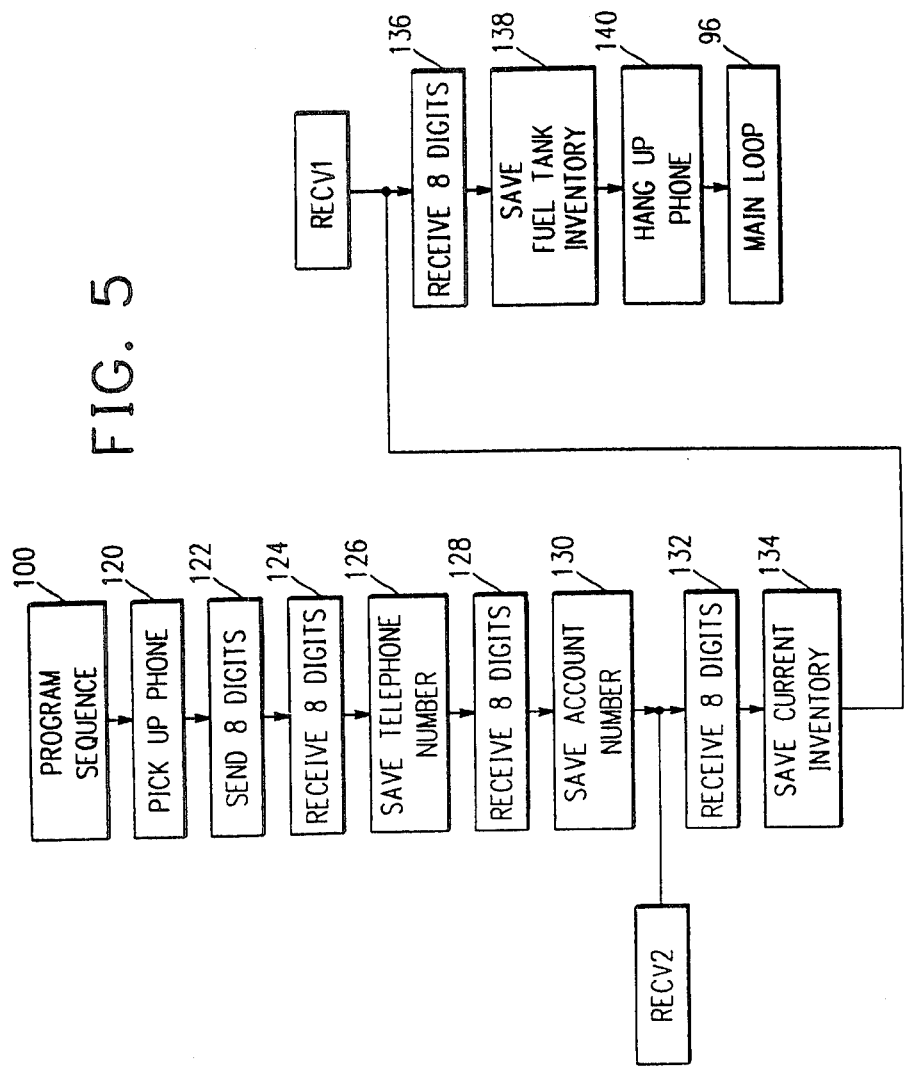
FIG. 5 is a flow diagram of the program sequence for exchange and storage of information between the customer system and the central computer modem.

Referring to FIG. 5, this initial programming initiated by the installer by depressing the program key 70, and the installer picks up the telephone at 120. The alarm system first sends a string of eight ASCII digits at 122 to the central computer 32 indicating that it is on line. Central computer 32 receives these eight digits at 122 and responds by sending four strings of eight ASCII digits, indicated in FIG. 5, by steps 126-138, for use and storage in each of the above described registers 52, 54, 42 and 40 of the computer section 20 of the alarm system. The first string of digits sent by computer 32 is the telephone number of the central computer modem 32 which is saved at 126 in the telephone number register 52 of the alarm system. The second string of digits is an account record number assigned by the computer 32 to the customer, and such number is received at 128 and saved at 130 in the record number register 54 of the computer section 20. The third string of digits is the current tank inventory, in units of minutes of pump run time, which is received at 132 and saved at 134 in the current inventory register, also referred to as the run time counter 40. The fourth string of digits is the tank capacity, in units of pump run time, which is received at 136 and saved at 138 in the tank capacity register 42 of the computer section 20. In this manner, the computer section 20 of the alarm system receives the four steps of data from the central computer 32 and stores it in its four registers thereby making the alarm system ready for service. The installer at the alarm system hangs up the telephone at 140 to complete the program sequence.

Figure 3:
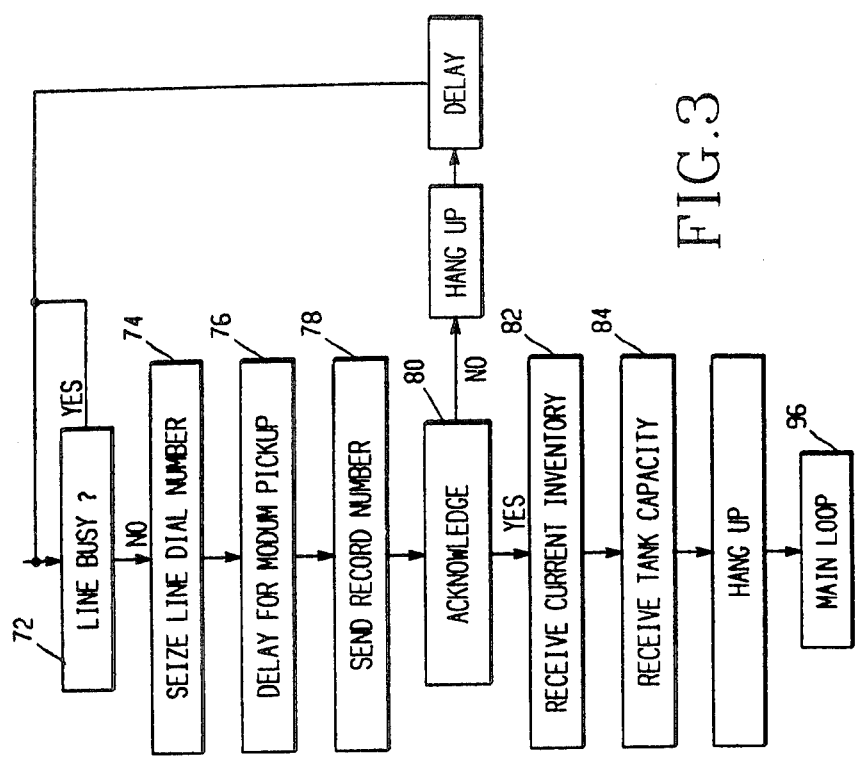
FIG. 3 is a flow diagram of the method for automatically calling the central computer modem.

Having been made ready for service, the alarm system monitors power supplied to the pump motor 14 through line 22. Upon receiving 3600 cycles on line 22, the alarm system subtracts one count from the current inventory register 40. If the current inventory counter or register 40 decrements past zero, such that a borrow occurs, an alarm condition is activated. The call sequence in FIG. 3 is initiated. Before a call to the central computer modem can take place it must be established at step 72 that the line is not presently busy. Once this is done, the alarm system enables via line 48 the hook switch 50 thereby seizing at step 74 the telephone service 28. Using the telephone number register 52, the alarm computer 20 pulses via line 86 the pulse dialer 26 the necessary number of times to make the call to the central computer modem 32 as indicated in FIG. 3 by step 76. The central computer modem 32 automatically answers the call and comes on line with a tone. Having seen this tone, the alarm computer 20 sends at step 78 a string of eight ASCII digits stored in the account record number register 54. The central computer 32, having received the record number, looks up the file and transmits at step 80 two strings of eight ASCII digits, the first being the reserve inventory at step 82 and the second being the full tank capacity at step 84 both in terms of pump run time. The alarm system saves the reserve inventory number in the current inventory register 40 and stores the full tank inventory in the tank capacity register 42. Receipt of these two numbers is confirmation that the transaction has been successful.

In the event of an unsuccessful call, the alarm system will try again in 4 minutes. Having completed a call to the central computer modem 32, the alarm system continues to monitor the pump run time, subtracting the minutes from the current inventory register 40 as they accrue. If delivery is not made before the reserve inventory is used, the alarm system will initiate another call to the central computer modem 32. When a delivery is made, the reset switch 34 is activated either manually or automatically. When the reset switch 34 is activated, the alarm system copies the contents of the tank capacity register 42 into the current inventory register 40.

As an example of the method of operating the alarm system disclosed, it is assumed that the alarm system is installed in a convenient place near the oil burner 12 and connected to use the electricity at the oil burner as its source of energy. Current inventory register or counter 40 has a capability for pre-setting to any desired number. Given a fuel oil storage tank with a capacity of 550 gallons, it is desired to know when 475 gallons has been consumed, leaving an inventory of 75 gallons as a sufficient reserve to permit a reasonable time between the receipt of the telephone signal and the delivery of fuel oil. This 75 gallon reserve is referred to above as the alarm level 24.

In the example, the size of the nozzle on oil burner 12 is rated at 1½ gallons per hour. It can be readily determined that it will take 316 hours and 40 minutes to consume 475 gallons. The run time calculation is carried out in steps 56, 58, 60, 62 and 64 of the process shown in FIG. 2 and in accordance with the equation (1) above. The pump run time calculated in step 62 of the method shown in FIG. 2 is stored in the current inventory register 40 and the tank capacity register 42 in terms of minutes of pump run time, thereby providing a desired alarm level consumption figure that is programmed into the system. The alarm system 20 is designed to require the setting of 1½ for nozzle size and 475 for the amount of oil to be consumed. The computation of the time factor, described above with respect to FIG. 2, is determined within the system through a computer program in a preferred embodiment of this invention.

When the gallonage number 475, converted by converter 66 to 68,400,000 is reached, the telephone dialer 26 is activated. The formula for making this conversion is:

$$\text{Run Time (hours)} = \frac{\text{Gallons}}{\text{Nozzle size}} \times (60 \text{ cycles per second})^3 = \text{Run Time}$$

-continued $$= \frac{475}{1.5} \times 216{,}000 = 68{,}400{,}000$$

Thus, in the above example a pump run time of 316 hours and 40 minutes (19,000 minutes total) will consume the 475 gallons of fuel oil down to the alarm level 24. During this time, operation of pump 14 by a 60 cycle per second electric current will have produced 68,400,000 cycles of current. This conversion of the pump run time to a count of 68,400,000 is carried out by converter 66 as described, and such number is set into the current inventory register 40 which counts the current pulses out of pulse shaper 38. In the embodiment shown in FIG. 1, the current inventory register 40 is a down-counter so that the alarm condition is reached when the register 40 counts down to zero.

Figure 4:
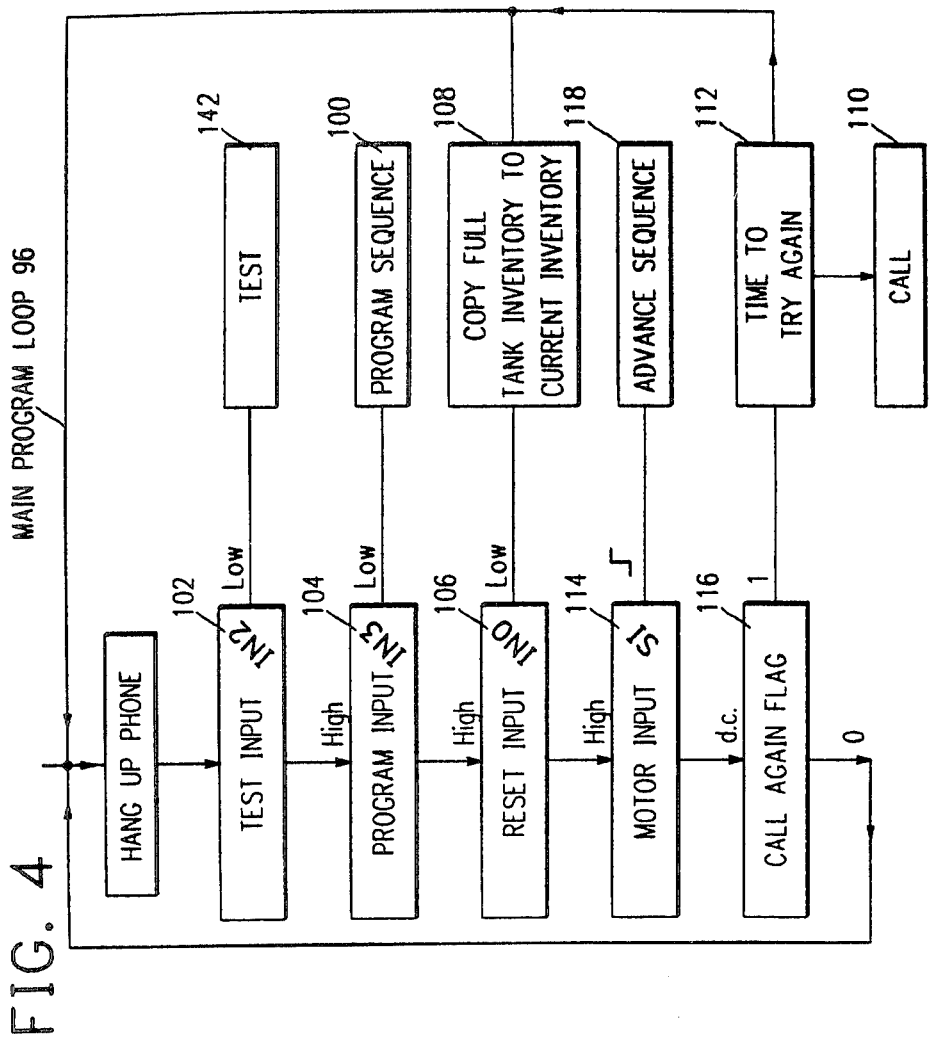
FIG. 4 is a flow diagram of the main program loop which is activated upon completion of the telephone communications between the alarm system in the customer's home and the computer modem at the utility company office.

FIG. 4 shows the main program loop 96 which, as shown in FIG. 3, is activated upon completion of the telephone communications between the alarm system and the central computer modem 32 at the utility company office. The main program loop 96 can be initiated by activating a test switch 98 when going through a test routine at 142 or when going through a program sequence at 100 and respectively involve a test input at step 102 and a program input at step 104. When an alarm system is first installed into a customer's home or office, the installer tests the program by depressing a "TEST" switch 98 which causes the alarm system to call the host as if the tank were empty. This test procedure is similar to the call procedure whereby the alarm system communicates with computer modem 32, as shown and described with respect to FIG. 3. A reset input at step 106 is initiated after the tank is filled for resetting the current inventory register 40 at the alarm system as shown at step 108. This copies the full tank capacity of register 42 into the current inventory register 40. Also, the main program loop shown in FIG. 4 is initiated when a call at 110 is not completed and it is time to try again at 112. The motor input is indicated at 114 and the call again flag is indicated at 116. When the call is made at 116 and the inventory is full at 108, the reset operation is made at 106 whereby the motor input at 114 is used to initiate the pump run time count advance sequence 118.

Referring again to FIG. 1, the pulse dialer 6 shown in FIG. 1 is a standard pulse dialer comprising a normally closed relay. Hook switch 50 normally connects the telephone line 30, indicated by the conventional tip (T) and ring (R) lines, to the telephone service 28. When conditions are met for communication between the alarm computer 20 and central computer 32, an enable signal on line 48 causes hook switch 50 to disconnect the telephone service 28 and seize the telephone line 30. At this point, the alarm computer 20 communicates through the normally closed connection of pulse dialer 26 with computer modem 32.

As discussed above, the busy detect circuit 51 is connected to telephone line 30 and includes voltage detection means for detecting the line voltage in the busy and non-busy states so that a call from the alarm computer 20 will not be initiated when the telephone service 28 is in use. Once communications between alarm computer 20 and the central computer 32 occurs through a tone generator 144 and a tone receiver 146 which are connected from the alarm computer 20 to the telephone lines 30 by means of an isolation transformer 148, the normally closed switch connection of the pulse dialer 26, and the hook switch 50. All data transmitted and received in the alarm computer 20 is in the form of "1" and "0" data tones, the computer 20 being a microprocessor which generates data tones from the programmed software contained therein. Accordingly, tone generator 144 provides the proper "0" and "1" levels for sending over the telephone lines in a synchronous format. Similarly, tone receiver 146 receives the tone signals from the line and converts them to appropriate "0" and "1" data for receipt in the alarm computer 20. Tone receiver 146 is of the conventional type including a filter circuit and suitable decoder means. It is noted that the pulse dialer 26, isolation transformer 148, tone generator 144 and tone receiver 146 are conventional circuits and operate in accordance with standard telephone practices. After communications between alarm computer 20 and the central computer 32 are completed, hook switch 50 is activated by removing the enable signal on line 48 thereby connecting the telephone service 28 to telephone lines 30 and disconnecting the pulse dialer 26 therefrom. In this fashion, the receipt and storage of information in the form of alarm data, identification numbers, instructions, account numbers and tank inventory data are performed by the alarm computer 20 using the system described above in connection with FIGS. 1–5.

Figure 6:
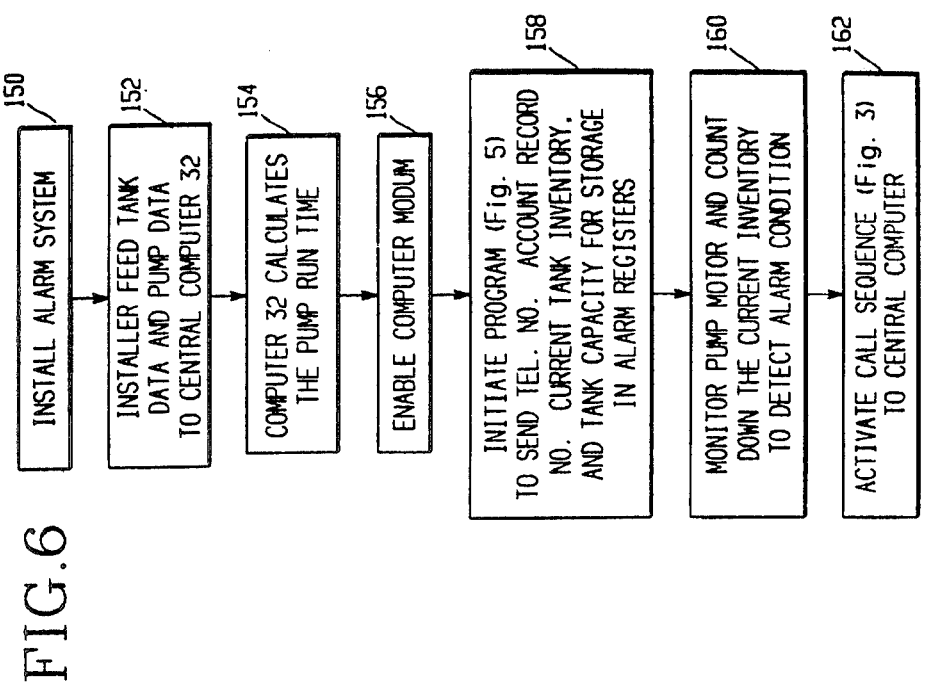
FIG. 6 is a general block diagram illustrating the methods of operation of the alarm system of the present invention.

FIG. 6 shows the general method of operation of the alarm system of the present invention. After the alarm system is installed at 150 at a site, the installer calls the central office and provides pertinent data at 150 to the central computer 32 including the nozzle size, tank capacity, the reserve desired at the alarm level, and the pulse generating rate of the pump. If the tank is not filled to capacity at the time, the present gallonage in the tank is provided by the installer to the central computer so that the pump run time can be computed by the computer as shown in FIG. 2 in accordance with the equation (1) above. Once the central computer calculates the pump run time at 154, the computer modem 68 is enabled as shown at step 156 and the program shown in FIG. 5 is initiated at 158 whereby the central computer provides data relating to the telephone number, account record number, current tank inventory, and tank capacity for storage in the alarm registers 52, 54, 40 and 42.

At this point the alarm system is made ready for service and monitors the electric power supplied to the pump motor as shown by step 160 wherein the current inventory counter decrements down to the predetermined alarm condition. When the alarm condition is reached, the telephone call sequence shown in FIG. 3 is activated as indicated by step 162. The central computer answers the call and exchanges information with the alarm system, including the account record number, the reserve inventory and the full tank capacity, both in terms of pump run time. The alarm system receives the reserve inventory number and in its current inventory register and also stores the full tank inventory in its tank capacity register for confirmation, thereby confirming that the transaction has been successful.

FIG. 7 is a circuit diagram of the detector 36 for the pump-on operation of the pump 14 and the pulse shaper 38 shown in FIG. 1. Essentially, the circuit converts the voltage applied to the pump motor 14 to a five-volt signal for use in the counter 40 which forms a part of the alarm computer 20 of the telephone dialer system. The motor detect circuitry includes a voltage converter including a capacitor 190 and resistor 192 connected to a diode 194 which is applied across an oscillator 196 including a diode 198 and transistor 200 for providing pulses at the output collector 202 which are fed to counter 40.

As described above, various switch inputs served to control the operation of computer control circuit 164 include a reset switch 34. Reset switch 34, or automatic fill switch 35, provides the signal on line 68 to counter 40 to reset the counter 40 and inform the alarm computer that the tank has just been filled. Program switch 70, shown in FIG. 1, provides a signal during the time of installation of the system. As described above, operation of program switch 70 inputs to the computer the initial data, i.e. host telephone number, computer identification number, tank capacity in terms of minutes of operation, and current tank gallonage. Also, test switch 98 provides means during the installation time for verifying the installation.

The program listing for the central computer for answering the telephone and exchanging data between the alarm system 20 and the central computer modem 32 in accordance with the above described program procedures is described below.

```
10    '********************************
20    '
30    ' FILE NAME IS "CMR SYSTEM"
40    '
50    '********************************
60    '
70    CLS 'CLEAR SCREEN
80    CLEAR 1000 "ASSIGN 1000 BYTES OF STRING
      STORAGE
90    '
100   '********************************
110   '
120   DETERMINE IF SYSTEM HAS BEEN SET UP
      PREVIOUSLY
130   '
140   '********************************
150   '
160   OPEN "I",1,"MASTER/DAT:1" 'SEQUENTIAL FILE
170   'MASTER/DAT HAS HOST TELEPHONE NUMBER
      AND NEXT RECORD
      NUMBER
180   INPUT#1,TEL$,NXTRECT,W$   'READ TELEPHONE
      NUMBER
190   CLOSE 1
200   'TEST FOR FIRST TIME SETUP
210   IF TEL$ = "000-0000" THEN GOSUB 1350
220   ' SET UP RS-232 FOR 300 BAUD COMMUNICATIONS
230   POKE 16890, 0 'DON'T WAIT SWITCH. 26-2112
      PAGE 47
240   POKE 16888,(5*16)+5 ' BAUD RATE CLOCK, 26-2112
      PAGE 45
250   DEFUSR0 = &H005A
260   X = USR0(0) 'SYSTEM CALL TO $RSINIT. 26-2111
      PAGE 113
270   DEFUSR1 = &H0050
280   DEFUSR2 = &H0055
290   CLS
300   '
310   '********************************
320   '
330   ' MAIN PROGRAM WAIT LOOP
340   '
350   '********************************
360   '
370   PRINT "TYPE L TO LOG IN NEW CUSTOMERS"
380   PRINT "TYPE T TO REPROGRAM CUSTOMERS
      ALREADY LOGGED IN"
390   '     CHECK FOR SERIAL INPUT
400   OUT 234,253 'DTR
410   X = USR1(o)
420   C1 = PEEK(16872)
430   ' CHECK FOR KEYBOARD INPUT
440   IF C1 > 47 AND C1 < 58 THEN GOTO 1570
```

-continued

```
450   '     TEST FOR KEYBOARD INPUT FOR LOGGING
      IN NEW CUSTOMERS
460   C$ = INKEY$
470   IF C$ = "L" THEN GOTO 500
480   IF C$ = "T" THEN GOTO 2660
490   GOTO 410
500   CLS
510   INPUT "CUSTOMER'S NAME"; NM$
520   INPUT "STREET ADDRESS   "; ADDR$
530   INPUT "CITY              "; CITY$
540   INPUT "STATE             "; STAT$
550   INPUT "ZIP CODE          "; ZIP$
560   INPUT "ACCOUNT NUMBER"; ACCT$
570   INPUT "TANK SIZE         "; TNK$
580   INPUT "FUEL RESERVE    "; RESRV$
590   INPUT "NOZZLE SIZE       "; NOZ$
600   INPUT "IS THIS A LOCAL CALL (Y/N)";LC$
610   IF LC$ = "Y" OR LC$ = "N" THEN GOTO 630
620   GOTO 600
630   GOSUB 2840
640   LSET A$ = ACCT$
650   LSET B$ = NM$
660   LSET P$ = ADDR$
670   LSET D$ = CITY$
680   LSET E$ = STAT$
690   LSET F$ = ZIP$
700   LSET G$ = TNK$
710   LSET H$ = RESRV$
720   LSET I$ = NOZ$
730   LSET J$ = LC$
740   R = NXTREC
750   PUT 2,R 'WRITE TO RECORD
760   CLOSE 2
770   INPUT "CURRENT INVENTORY"; INV$
775   INPUT "TURN ON MODEM, HIT ENTER", X$
780   X = USR1(0)
790   C1 = PEEK916872)
800   IF C1 < 48 OR C1 > 63 THEN GOTO 780
810   GOSUB 2330
820   IF E = -1 THEN GOTO 2620 ' TIMED OUT
830   OUT 234,252 'REQUEST TO SENT
840   TNK = VAL(G$)
850   RESRV = VAL(H$)
860   NOZ = VAL(I$)
870   MINUT = 60*(TNK-RESRV)/NOZ
880   ' SEND TELEPHONE NUMBER
890   W$ = "0" + RIGHT$(W$,7)
900   IF J$ = "Y" THEN GOTO 920
910   W$ = "1" + RIGHT$(W$,7)
920   S$ = W$
930   FOR Z = 1 to 500
940   NEXT Z
950   PRINT "SENDING TELEPHONE NUMBER   ";
960   GOSU x 2450 'OUTPUT B CHARACTERS
970   V$ = STR$(R)
980   V = LEN(V$) - 1
990   V$ = RIGHT$(V$,V)
1000  V$ - "00000000" + V$
1010  V$ = RIGHT$(V$,8)
1020  S$ = V$
1030  PRINT "SENDING RECORD NUMBER    ";
1040  GOSUB 2450 'SEND RECORD NUMBER
1045  MINUT = MINUT + .5
1050  MINUT = INT(MINUT)
1060  V$ = STR$(MINUT)
1070  V = LEN(V$) - 1
1080  V$ = RIGHT$(V$,V)
1090  V$ = '00000000" + V$
1100  V$ = RIGHT$(V$,8)
1110  S$ = V$
1120  PRINT "SENDING MINUTES RUN TIME   ";
1130  GOSUB 2450
1135  INV = VAL(INV$)
1140  MINUT = 60*(INV-RESRV)/NOZ
1145  MINUT = MINUT + .5
1150  MINUT = INT(MINUT)
1160  V$ = STR$(MINUT)
1170  V = LEN(V$) - 1
1180  V$ = RIGHT$(V$,V)
1190  V$ = "00000000" + V$
1200  V$ = RIGHT$(V$,8)
1210  S$ = V$
```

```
-continued
1220  PRINT "SENDING MINUTES RESET TIME    ";
1230  GOSUB 2450
1240  NXTREC = NXTREC + 1
1250  GOSUB 1440
1260  X = USR1(0)
1270  GOTO 290
1280  '
1290  '*******************************
1300  '
1310  ' INITIAL SETUP OF HOST SYSTEM
1320  '
1330  '*******************************
1340  '
1350  PRINT "TYPE IN THE TELEPHONE NUMBER OF
      THE HOST COMPUTER"
1360  W$ = "0"
1370  PRINT "USE THE FOLLOWING FORMAT" 256-0700"
1380  INPUT "TELEPHONE NUMBER";TEL$
1390  IF LEN(TEL$) = 8 THEN 1400 ELSE 1350
1400  FOR F = 1 TO 8
1410  GOSUB 1500
1420  IF E = -1 THEN GOTO 1350
1430  NEXT F
1140  OPEN "0",1,"MASTER/DAT:1"
1450  PRINT#1,TEL$
1460  PRINT#1,NXTREC
1470  PRINT#1, W$
1480  CLOSE 1
1490  RETURN
1550  T$ = MID$(TEL$,F,1)
1510  E = 0
1520  IF T$ = "-" AND F = 4 THEN RETURN
1530  IF T$ > "9" OR T$ < "0" THEN E = -1
1540  IF T$ = "0" THEN T$ = ":"
1550  W$ = W$ + T$
1560  RETURN
1570  R$ = CHR$(C1)
1580  CLS
1590  PRINT "PROCESSING A CALL"
1600  J = 1
1620  FOR K = 1 TO 1000
1625  Z = INP(232)
1630  Z = USR1(0)      ' READ SERIAL PORT
1640  C1 = PEEK(16872)
1650  IF C1 = 0 THEN NEXT K
1660  IF C1 > 47 AND C1 < 58 THEN 1790
1670  PRINT "CALL ABORTED"
1680  FOR I = 1 TO 1000
1690  NEXT I
1700  GOTO 290
1710  CO = 16880
1720  POKE C0,65
1730  X = USR2(0)
1740  FOR K = 1 TO 200
1750  NEXT K
1760  R$ = ""
1770  J = 0
1780  GOTO 1610
1790  R$ = R$ + CHR$(C1)
1800  J = J + 1
1810  IF J < 8 THEN GOTO 1620
1820  R = VAL(R$)
1830  IF R < NXTREC THEN GOTO 1840 ELSE GOTO 1680
1840  OUT 234,252 'RTS
1850  GOSUB 2840
1860  GET 2,R
1870  CLOSE 2
1880  TNK = VAL(G$)
1890  RESRV = VAL(H$)
1900  NOZ = VAL(I$)
1910  MINUT = 60*(TNK-RESRV)/NOZ
1915  MINUT = MINUT + .5
1920  MINUT = INT(MINUT)
1930  V$ = STR$(MINUT)
1940  V = LEN(V$) - 1
1950  V$ = RIGHT$(V$,V)
1960  V$ = "00000000" + V$
1970  S$ = RIGHT$(V$,8)
1980  PRINT "SENDING MINUTES RUN TIME    ";
1990  GOSUB 2450
2000  MINUT = 60*RESRV*.25/NOZ 'RESERVE CALCU-
      LATION
2005  MINUT = MINUT + .5
2010  MINUT = INT(MINUT)
2020  V$ = STR$(MINUT)
2030  V = LEN(V$) - 1
2040  V$ = RIGHT$(V$,V)
2050  V$ = "00000000" + V$
2060  S$ = RIGHT$(V$,8)
2070  PRINT "SENDING MINUTES RESET TIME    ";
2080  GOSUB 2450
2090  LPRINT "CUSTOMER NAME", B$
2100  LPRINT "ADDRESS    ", P$
2110  FOR L = 1 TO 20
2120  X$ = RIGHT$(D$,1)
2130  M = 20 - L
2140  IF X$ = " " THEN 2150 ELSE 2170
2150  D$ = LEFT$(D$,M)
2160  NEXT L
2170  FOR L = 1 TO 20
2180  X$ = RIGHT$(E$,1)
2190  M = 20 - 1
2200  IF X$ = " " THEN 2210 ELSE 2230
2210  E$ = LEFT$(E$,M)
2220  NEXT L
2230  D$ = D$ + "," + E$ + " " + F$
2240  LPRINT "    ", D$
2250  LPRINT
2260  LPRINT "ACCOUNT NUMBER", A$
2270  LPRINT "DATE -TIME  ",TIME$
2280  LPRINT
2290  LPRINT
2300  LPRINT
2310  LPRINT
2320  GOTO 290
2330  'DETC WITH TIMEOUT DELAY
2340  E = 0
2350  FOR D = 1 TO 1000
2360  X = USR1(0)
2370  C1 = PEEK(16872) 'GET CHARACTER
2380  IF C1 > 47 AND C1 < 64 THEN GOTO 2420
2390  NEXT D
2400  E = -1
2410  RETURN
2420  Z = INP(232) 'TEST CARRIER DETECT BIT 5
2430  IF Z < 160 THEN GOTO 2420
2440  RETURN
2450  FOR L = 1 TO 10000
2460  Q = INP(232) 'CLEAR TO SEND?
2470  IF Q < 128 THEN GOTO 2500
2480  NEXT I
2490  GOTO 2870
2500  FOR I = 1 TO 8
2510  C$ = LEFT$(S$,1)
2520  CO = 16880
2530  POKE CO, ASC(C$)
2540  X = USR2(0)
2550  J = 8 - I
2560  S$ = RIGHT$(S$,J)
2570  IF C$ = ":" THEN C$ = "0"
2580  PRINT C$;
2590  NEXT I
2600  PRINT
2610  RETURN
2620  PRINT "TIMED OUT"
2630  FOR I = 1 TO 3000
2640  NEXT I
2650  GOTO 290
2660  INPUT "RECORD NUMBER"; R
2670  OPEN "I",1,"MASTER/DAT:1"
2680  INPUT#1,TEL$,NXTREC
2690  CLOSE 1
2700  IF R < NXTREC THEN GOTO 2730
2710  PRINT "INVALID RECORD NUMBER"
2720  GOTO 370
2730  GOSUB 2840 'OPEN RANDON FILE
2740  GET 2,R
2750  CLOSE 2
2760  GOTO 770 'PROGRAM REMOTE UNIT
2770  '
2780  '*******************************
2790  '
2800  ' OPEN RANDOM FILE
2810  '
```

-continued

```
2820   '*******************************
2830   '
2840   OPEN "R", 2, "CUSTOMER/REC 1"
2850   FIELD 2,8 AS A$,20 AS B$,20 AS P$, 20 AS D$,20 AS E$,
       5 AS F$,5 AS G$,5 AS H$,5 AS I$,1 AS J$
2860   RETURN
2870   PRINT
2880   PRINT "NO CLEAR TO SEND. HIT ANY KEY TO
       CONTINUE."
2890   C$ = INKEY$
2990   IF C$ = ""THEN GOTO 2890
2910   GOTO 290
```

While the invention has been described above with respect to its preferred embodiments, it should be understood that other forms and embodiments may be made without departing from the spirit and scope of the invention.

What is claimed is:

1. An alarm system for installation at a utility customer's location for informing a utility central office when the consumption of fuel in a tank has been depleted to a predetermined alarm level, comprising:

means for calculating a pump run time number representative of the number of cycles of electricity consumed in operating an electric pump for displacing the fuel in said tank to a predetermined alarm level;

memory means for storing said pump run time number;

detecting means connected to the electrical supply to said pump for detecting the number of cycles of electricity consumed by said pump during pump operation;

counter means connected to said detector means for counting the number of detected electrical cycles until the counted number is equivalent to the pump run time number stored in said memory means to thereby provide an alarm signal; and telephone dialer means connected to the telephone service and responsive to said alarm signal from said counter means, said telephone dialer means including means responsive to said alarm signal for automatically calling from the customer telephone service to a central computer modem in said central office for informing said computer modem of said alarm condition whereby a delivery of fuel is requested to fill said tank;

whereby the central computer modem is automatically informed over the customer telephone lines of the alarm condition at its customer storage tank indicating that a delivery of fuel is necessary.

2. System as recited in claim 1 wherein said detecting means includes means for detecting the cycles of alternating electric current supplied to said pump during operation, and means for supplying the detected cycles to said pump run time counter.

3. System as recited in claim 2 wherein said detecting means includes voltage conversion means for converting the amplitude of the alternating electric current supplied to said pump to pulse receivable in said counter means.

4. System as recited in claim 1 wherein said counter means is connected to a reset switch means for resetting said counter after said tank has been filled.

5. System as recited in claim 1 wherein said means for calculating a pump run time number includes calculating the displacement volume rate of said pump with the number of cycles of electricity converted during operation of said pump to displace a predetermined amount of fuel from a filled level to a predetermined alarm level at which a predetermined reservoir of fuel is present, said calculated pump run time number corresponding to the operating time of the pump for reducing the fuel to said predetermined alarm level.

6. System as recited in claim 1 wherein said means for calculating a pump run time number includes means for converting the number of gallons to be converted to achieve the predetermined alarm level in said tank into a corresponding number based on the run time of said pump for displacing said gallonage by said pump.

7. System as recited in claim 1 wherein said telephone dialer means includes busy detect means for detecting that the telephone lines are available for use, said busy detect means being connected to said automatic dialer circuit for enabling initiation of a call to said central computer modem, and means for sending data via said telephone network to said central computer modem indicative of the pump run time number.

8. System as recited in claim 1 wherein said telephone dialer means includes hook switch means for seizing the customer telephone lines and connecting said alarm system to said lines, said hook switch being responsive to a busy detect circuit connected to said telephone lines to determine if the lines are available for use.

9. System as recited in claim 1 wherein said telephone dialer means includes means for storing data indicative of the customer account number associated with said fuel tank, and means for storing the telephone number of the central computer modem for automatic dialing by said telephone dialer means.

10. Method of automatically informing a utility company when the consumption of fuel in a tank at a customer location has been depleted to a predetermined alarm level, comprising:

calculating a pump run time number representative of the number of cycles of electricity consumed in operating an electric pump for displacing the fuel in said tank to a predetermined alarm level;

detecting the cycles of electricity consumed by said pump during operation;

counting the number of detected electrical cycles until the counted number is equivalent to said pump run time number stored in said memory means to thereby provide an alarm signal; and connecting an automatic telephone dialer to the customer telephone service for automatically calling from the customer telephone service to the utility company; and automatically operating said telephone dialer in response to said alarm signal to place a telephone call informing said utility company of said alarm condition whereby a delivery of fuel is requested to fill said tank;

whereby the utility company is automatically informed over the customer telephone lines of the alarm condition at its customer tank and the requirement that fuel be delivered.

* * * * *